United States Patent [19]
MacIntyre et al.

[11] Patent Number: 5,408,640
[45] Date of Patent: Apr. 18, 1995

[54] PHASE DELAY COMPENSATOR USING GATING SIGNAL GENERATED BY A SYNCHRONIZER FOR LOADING AND SHIFTING OF BIT PATTERN TO PRODUCE CLOCK PHASES CORRESPONDING TO FREQUENCY CHANGES

[75] Inventors: Douglas A. MacIntyre, Allston; Thomas B. Hawkins, Boylston, both of Mass.

[73] Assignee: Digital Equipment Corporation, Maynard, Mass.

[21] Appl. No.: 995,311

[22] Filed: Dec. 22, 1992

Related U.S. Application Data

[63] Continuation of Ser. No. 482,597, Feb. 21, 1990, abandoned.

[51] Int. Cl.[6] .............. G06F 1/04; G06F 1/08; G06F 1/06; G06F 1/12
[52] U.S. Cl. .................... 395/550; 364/270; 364/270.2; 364/270.3; 364/DIG. 1
[58] Field of Search ............ 307/269; 395/550

[56] References Cited
U.S. PATENT DOCUMENTS

| | | | |
|---|---|---|---|
| 4,190,807 | 2/1980 | Weber | 331/1 A |
| 4,191,998 | 3/1980 | Carmody | 395/550 |
| 4,223,392 | 9/1980 | Lemaine et al. | 395/550 |
| 4,386,401 | 5/1983 | O'Brien | 395/550 |
| 4,593,379 | 6/1986 | Fourcade et al. | 395/550 |
| 4,998,075 | 3/1991 | Patton et al. | 307/269 |
| 4,999,526 | 3/1991 | Dudley | 307/269 |
| 5,043,596 | 8/1991 | Masuda et al. | 307/262 |
| 5,086,500 | 2/1992 | Greub | 395/550 |
| 5,087,829 | 12/1992 | Tshibashi et al. | 307/269 |
| 5,122,679 | 6/1992 | Ishii et al. | 307/269 |
| 5,133,064 | 7/1992 | Hotta et al. | 395/550 |

*Primary Examiner*—Thomas C. Lee
*Assistant Examiner*—D. Dinh
*Attorney, Agent, or Firm*—Denis G. Maloney; Arthur W. Fisher

[57] ABSTRACT

A phase delay compensator apparatus is provided which compensates for the phase error caused by propagation delay differences between clock and data paths within a computer system. A look-up table circuit is used to dynamically translate a change in frequency of the computer system clock or a change in the length of cable connecting the computer's sub-assemblies to a binary bit pattern defining the requisite phase-shift between distributed clock and data signals. A generator circuit produces phases of the phase-shifted clock signals, while ensuring the integrity of the loaded binary bit pattern. A gated signal is created for enabling the generator circuit.

13 Claims, 5 Drawing Sheets

FIG. 2
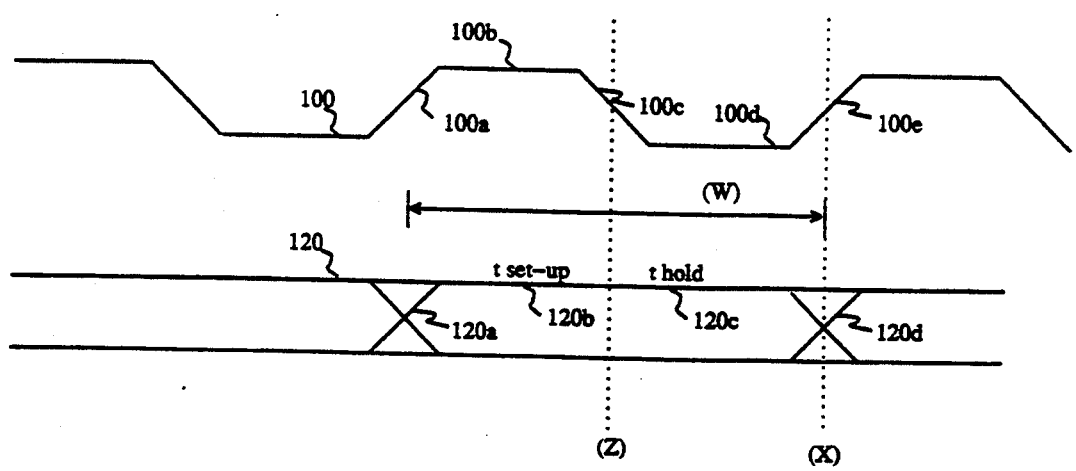
FIG. 2A
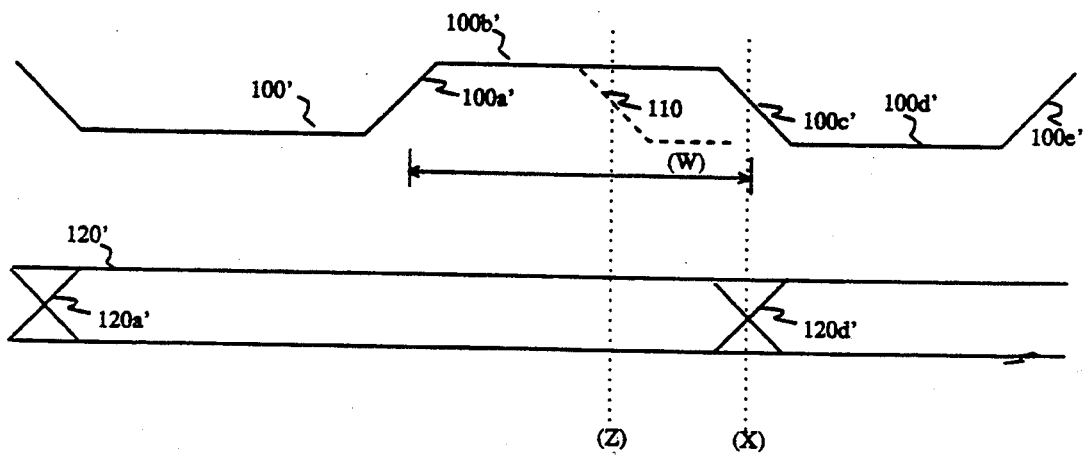
FIG. 2B

PHASE DELAY COMPENSATOR USING GATING SIGNAL GENERATED BY A SYNCHRONIZER FOR LOADING AND SHIFTING OF BIT PATTERN TO PRODUCE CLOCK PHASES CORRESPONDING TO FREQUENCY CHANGES

This application is a continuation of application Ser. No. 07/482,597, filed Feb. 21, 1990, now abandoned.

BACKGROUND OF THE INVENTION

The invention relates to a method and apparatus for maintaining the phase relationship between a computer's clock signals and associated data, and, more specifically, to a phase delay compensator circuit which compensates for the phase error caused by propagation delay differences between clock and data signal paths.

The design of modern high performance computer systems typically involves development of individual subsystems or sub-assemblies, examples of which include a central processing unit, a memory unit, system clock unit, a system control unit, and an input/output (I/O) unit. These sub-assemblies, which are thereafter integrated to form the computer system, may be physically separated from one another, thereby requiring transmission lines or cables to connect the sub-assemblies and provide a means for transfering or communicating information between them. If the distance between the sub-assemblies change, then different length cables are required.

The system clock unit typically creates clock signals used for timing the computer's electronic components and devices. In a frequency-agile synchronous computer system, the frequency of the system clock may dynamically change due to diagnostic testing, that is, the frequency of the created clock signals may be altered as part of the diagnostic testing without having to power-down the computer system. These clock signals are then distributed along cables to the other sub-assemblies within the computer system.

When communicating between different sub-assemblies, it is desirable for the clock signals and its associated data to arrive at a destination, such as a state device or flip-flop, in a defined manner to ensure proper computer operation. In other words, the position of the clock signal used for enabling the state device relative to the data to be stored by that device must be maintained in a defined timing relationship to avoid a race condition. In many circuits or logic networks, a situation may occur where more than one state device in the network must change state, or its stored value, in response to a single change in the network's input. A race condition arises when the possibility exists that one of two different stable states may result depending upon the order in which the devices change state.

In order to avoid a race condition and maintain a defined sequence of device operation within the computer system, it is desirable that the cables or paths along which the clock and data signals propagate have approximately equal propagation delay characteristics. Propagation delay is the time needed by a signal to travel from a transmitter to a receiver. Tolerance variations in the manufacture of similar components such as cables may introduce unpredictable skewing in the transmission of signals, that is, the variations may introduce additional delay differences between the clock and data paths. Also, changing the length of the cables used to connect the sub-assemblies could add delay into the signal paths. The occurance of such physical events may potentially alter the phase or timing relationship between the clock and data signals. On the other hand, a changing of frequency of the system clock, referred to as a system designed event, may vary the position of the distributed clock signals relative to the data and require signal phase adjustment to compensate for any resulting phase or timing error.

Attempts to adjust the phase of clock signals typically involved a circuit that created multiple phases of a particular reference clock signal, the reference clock signal being loaded into a shift register by a master clock signal. The output of the shift register was then presented to a selector where phase selection was performed. However, the use of commercially available electronic components to implement the selecting logic function introduced additional skew in the circuit path, causing significant delay and constraining performance of the overall circuit.

Therefore, in accordance with an aspect of the present invention, a feature is to provide a phase delay compensator circuit which minimizes the logic required for clock phase selection in order to increase clocking speed.

Additionally, a feature of the present invention is to provide a phase delay compensator which allows the changing of cables connecting various sub-assemblies of a computer system without causing timing race conditions.

In accordance with another aspect of the invention, a feature is to provide a phase delay compensator which compensates for the phase error caused by propagation clock signal to data path differences.

A further feature of the present invention is to provide a phase delay compensator which allows the changing of the frequency of a synchronous computer's system clock without causing timing race conditions.

SUMMARY OF THE INVENTION

The foregoing and other features of the invention are accomplished by providing a phase delay compensator apparatus which maintains a requisite phase relationship between a clock signal and its associated data in a synchronous computer in response to a phase change arising out of a change in the frequency of the computer's system clock or a change in a the length of the cable connecting sub-assemblies of the computer. In general, a look-up table circuit is used to dynamically translate the phase change to a binary bit pattern defining a phase-shifted clock signal. A generator circuit, coupled to the look-up table circuit, produces various phases of the phase-shifted clock signal, while ensuring the integrity of the loaded binary bit pattern. A gated signal is created for enabling the generator circuit.

Other objects, features and advantages of the invention will become apparent from a reading of the specification when taken in conjunction with the drawings, in which like reference numerals refer to like elements in the several views.

BRIEF DESCRIPTION OF THE DRAWINGS

FIG. 2 is a timing diagram graphically illustrating the problem addressed by the present invention relating to the relative position of a clock signal and associated data;

DESCRIPTION OF THE PREFERRED EMBODIMENTS

Figure 1:
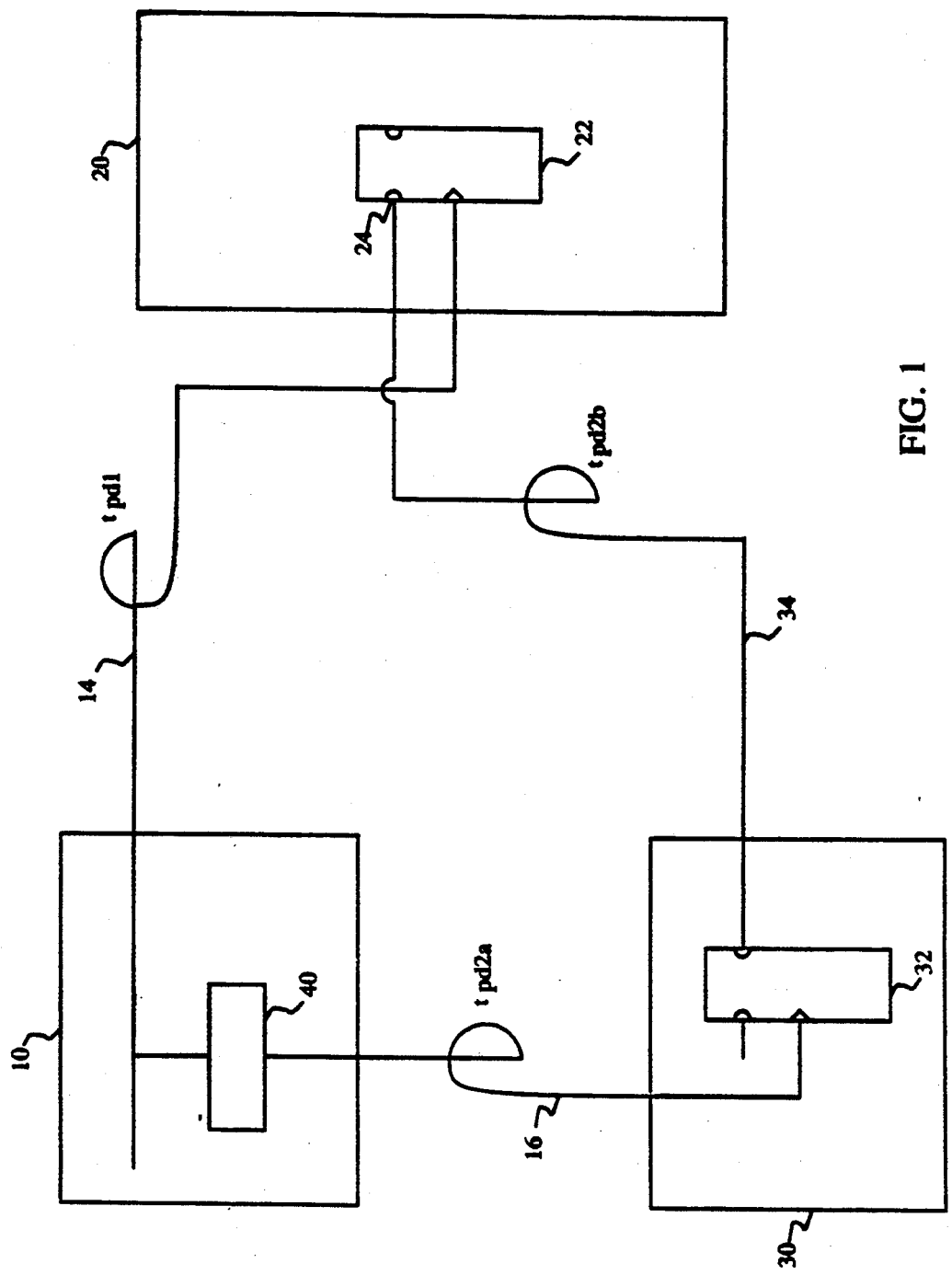
FIG. 1 shows a block diagram of a typical application of a phase delay compensator apparatus according to the invention.

Referring now to FIG. 1, there is shown a block diagram of portions of a frequency-agile, high-performance synchronous computer system, the various blocked portions representing certain sub-assemblies within the computer such as the clock unit assembly 10, the control unit assembly 20, and the I/O unit assembly 30. The clock unit 10 creates clock signals which are used for enabling certain electronic components and devices in the clock unit 10, the control unit 20 and the I/O unit 30. In accordance with the invention, the phase delay compensator apparatus 40 is located within the clock unit 10, while state devices 22, 32, which are enabled by the clock signals created in clock unit 10, are located in the control unit 20 and I/O unit 30.

The clock signals generated by clock unit 10 include a high frequency clock (HFC) signal and a low frequency clock (LFC) signal. Typically, the HFC signal is initially created and then frequency divided into a series of LFC signals, which are thereafter distributed to the sub-assemblies in the computer. In a preferred embodiment of the invention, the HFC signal has a frequency of approximately 500 MHz and a period of 2 nanoseconds, while the LFC signal has a frequency of approximately 62.5 MHz and a period of 16 nanoseconds.

Due to constraints caused by the physical separation of the sub-assemblies, cables 14, 16 are used to provide clock paths for the LFC signals originating in the clock unit 10 and distributed to the control unit 20 and I/O unit 30. Likewise, cable 34 is used to provide a path for transfering data between the I/O unit 30 and control unit 20. In accordance with a feature of the present invention, the clock and data signals forwarded to the control unit 20 are to arrive in a defined phase or sequence at the state device 22, thereby avoiding potential race conditions.

Cables 14, 16 are transmission lines along which signals propagate and, as such, cable 14 has a propagation delay characteristic $t_{pd1}$, while the cable 16 has a propagation delay characteristic $t_{pd2a}$. Cable 34, also a transmission line, is used to forward data signals to the state device 22 in control unit 20 and has a propagation delay characteristic $t_{pd2b}$. In order to avoid a race condition, it is desired that a requisite phase relationship consistent with the following cable length delay expression be maintained between the clock and data signals driven to state device 22:

$$t_{pd1} = t_{pd2a} + t_{pd2b} + nT$$

where nT are integer numbers of LFC time periods. This time relationship may be altered, resulting in phase error, due to (i) tolerance variations in the manufacture of similar cables, (ii) cable length variations, (iii) variations in clock frequency, or (iv) all the above. Nevertheless, the inventive combination and concepts defined herein provide a means of compensation for such phase error.

As mentioned, the frequency of the system clock can dynamically vary for diagnostic purposes, causing the frequency of the distributed LFC signals to vary accordingly. In this situation, when the frequency of the LFC signal changes, the position or phase of that LFC signal relative to the data at the input of the state device 22 also changes, creating an offset which increases the likelihood of a race condition. If the computer system were not frequency-agile, a solution would be to adjust the phase of the data relative to the LFC signal offset, so that at the end of the clock and data paths, the signals are again in phase. However, for a frequency-agile computer system, the phase relationship required to compensate for the offset changes as a function of frequency.

Therefore, the phase relationship between the relative position of the LFC signal and data presented to the state device 22 of control unit 20 may be expressed as:

$$\phi_{cd} = \phi_{off} - [t_{pd1} - (t_{pd2a} + t_{pd2b})] * f$$

where $\phi_{cd}$ is the phase relationship between the clock and data signals at state device 22, $\phi_{off}$ is the created phase offset and f is the change in frequency. A change in phase due to a change in frequency can therefore be expressed as:

$$\Delta\phi = t * \Delta f$$

and a change in phase due to a change in cable time delay can be expressed as:

$$\Delta\phi = \Delta t * f$$

Referring also to FIG. 2, there is shown a timing diagram graphically illustrating a plurality of signals oriented in timed relation in the vertical direction. On the horizontal scale, there are depicted two instances of time, designated X and Z, which will be utilized as reference times in the succeeding discussion. A clock signal 100 used for capturing data 120 into state device 22 is illustrated in FIG. 2A. The transition portion 120d of data 120 is triggered relative to the rising edge 100a of the clock signal 100 at a time X, the time offset W between the rising edge 100a and the transition portion 120d being determined according to the cable length delay expression previously described and which, for the following illustrative purposes, is preferably 16 nanoseconds. The trailing edge 100c of the clock signal 100 at time Z is used to receive/capture the data 120 into the state device 22, preferably at a time that does not violate the set-up/hold times of the device 22. Stated another way, the data 120 presented to the input 24 of the state device 22 must be stable for a time $t_{set-up}$, designated 120b, before the clock signal 100 is allowed to transition at 100c, and must remain in the same state a time $t_{hold}$ afterwards, designated 120c, in order to ensure both the optimum central strobing point of the data 120 and a predictable future state of the device 22.

In FIG. 2B, the phase of the clock signal 100' has changed due to, for example, a change in frequency of the system clock. Although the time offset W between the rising edge 100a' of the clock signal 100' and the transition portion 120d' of data 120' has not changed, the location of the trailing edge 100c' of clock signal 100' has moved closer in time and phase to the transition portion 120d' of data 120' at time X, which is farther out in time than at time Z. In other words, the relative position of the trailing edge 100c' of the clock signal 100' at time X is getting closer to the transition portion 120d' of the data 120', thus increasing the likelihood of violating set-up/hold times.

In order to avoid the situation described above, it is desired to adjust the phase of the clock signal 100' transmitted to the state device 22. Knowing the desired position of the trailing edge of the clock signal, a new copy of the clock signal 100' having a trailing edge 110 closer to the center of the data cycle 120' at time Z can be created. Therefore, the phase of the clock signal 100' presented to the state device 22 may be re-adjusted having knowledge of the current frequency of the clock.

Figure 3:
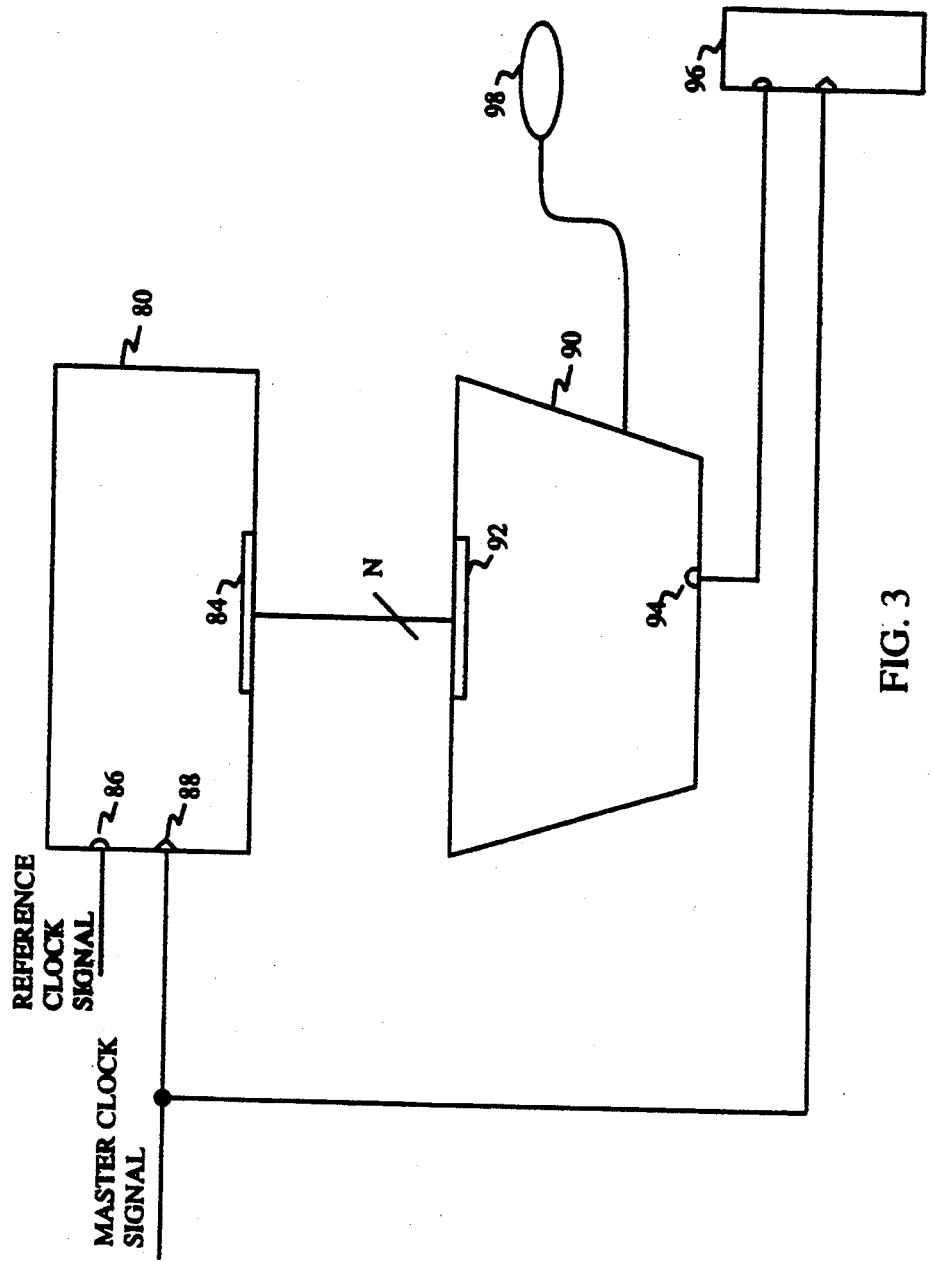
FIG. 3 is a circuit diagram of an embodiment of the prior art solution to the timing problem of FIG. 2.

FIG. 3 depicts a circuit diagram of a prior attempt to adjust the phase of a clock signal. A shift register 80 having a serial data input 86, a clocking input 88 and a parallel output 84, serially shifts a reference clock signal having a particular phase and duty cycle into data input 86 in time increments of the master clock signal applied to the clocking input 88. A number of copies N, preferably eight, of the reference clock signal are created, each separated by the master clock time period, resulting in a family of reference clock signals driven into the input 92 of a selector 90. The output 94 of the selector 90 is tied to a state device 96. The selector 90, preferably an 8:1 multiplexer, is enabled by a 3-bit word 98 which is a function of the changed system clock frequency. The state device 96 is then triggered by the master clock signal to retime the selector's output 94, that is, to get the optimum strobe location with respect to the data. Later, if the frequency or delay of the reference signal is altered, a different bit is chosen from the selector's output 94 to compensate for any phase difference.

The propagation delay through the selector/multiplexer 90 operating at high frequencies, for example above 400 MHz, is dependent upon the components used to construct the multiplexer logic 90, such logic 90 requiring expensive, high speed electronic components. These electronic components introduce skew/delay of approximately 2–3 nanoseconds into the circuit path, which decreases phase selection speed and performance. Such components also dissipate large amounts of power, resulting in low reliability and consuming significant circuit real-estate. In order to reduce the skew, re-timing of the multiplexer output 94 with a high speed state device 96 is necessary. Yet, the devices 80, 90 have sufficient delay uncertainty due to device tolerances that a timing race condition is likely when trying to operate at master clock frequencies above 400 MHz.

Therefore, in accordance with the teachings of the present invention and referring again to FIG. 1, a phase delay compensator apparatus 40 is provided, the phase delay compensator circuit 40 producing a phase-shifted, reference clock signal, that is, a generated LFC signal, whose relative phase is proportional to a binary value of the altered system clock frequency and the nominal difference between the I/O unit 30 to control unit 20 data delay and the clock unit 10 to control unit 20 LFC signal delay. The increments of phase-shift are equal to the period of the HFC signal, which is preferably 8 times the LFC signal. The phase delay compensator apparatus 40 supports circuit operation in excess of 400 MHz with a resulting timing skew created by the generation of the phase-shifted LFC signal of less than 500 picoseconds.

The phase delay compensator apparatus 40 achieves high performance, i.e. high operating frequency and low skew, by minimizing the number of logic gates between state devices in the circuit path. In other words, the phase delay compensator apparatus 40 selects/programs the desired system clock phases without the use of multiplexer logic. The only "gating" that impacts the performance of the compensator circuit 40 is that associated with a shift register's shift/load function, the logic of which is internal to the register package. In fact, the signal used to enable the phase delay compensator apparatus 40 is a gated signal created by coupling the state devices in a synchronizer configuration. This synchronizer configuration, as described in detail below, eliminates the need for the additional logic gates.

Figure 4:
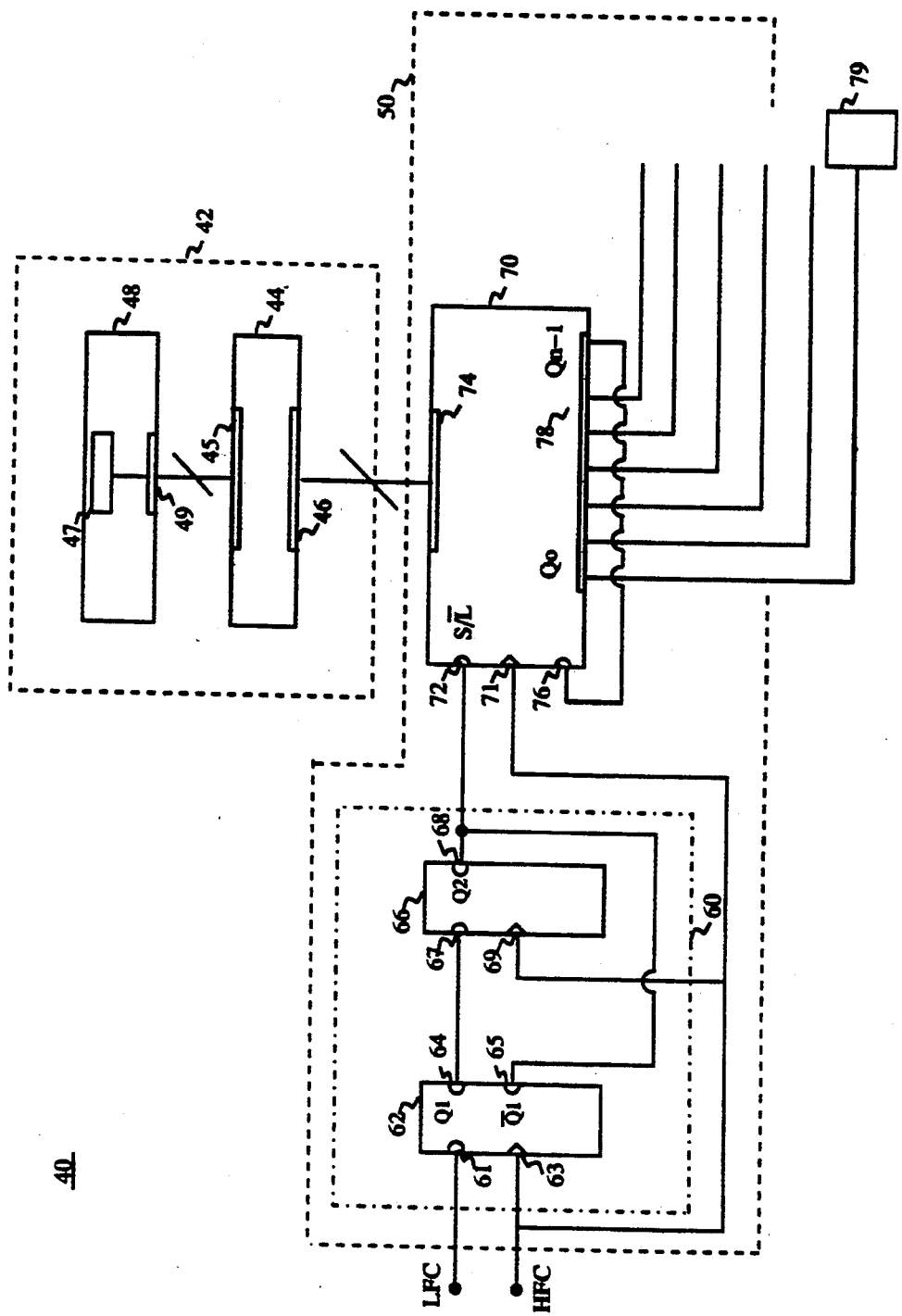
FIG. 4 depicts a circuit diagram of an embodiment of the phase delay compensator apparatus used in the application of FIG. 1.

Referring now to FIG. 4, a circuit diagram of an embodiment of the phase delay compensator apparatus 40 used in the application of FIG. 1 is depicted, the phase delay compensator apparatus 40 including a look-up table circuit, generally designated 42, and a programmable clock-phase generator circuit, generally designated 50. In accordance with the principles of the present invention, the look-up table 42 provides particular phase-shift bit patterns to the generator 50 which, in turn, produces the desired clock phases.

The look-up table circuit 42 dynamically translates a change in either the computer system clock frequency or the cables used to connect the sub-assemblies to a binary bit pattern that defines a phase-shift required to re-align the position of the LFC signal to its associated data. The bit pattern relates to the desired LFC phase and duty cycle so that, irrespective of the current system operating frequency or cables, the requisite phase relationship between the generated LFC signal and data is maintained.

Further, the programmable clock-phase generator circuit 50 produces various phases of the desired LFC pattern provided by the look-up table circuit 42, thereby compensating for frequency-proportional changes to the optimum central strobing point of the data presented to a state device. The generator circuit 50 detects a rising edge on the reference LFC signal, loads the binary bit pattern, and thereafter produces a number of phases of the phase-shifted LFC signal, any of which may be accessed and distributed within the computer system.

In accordance with the present invention, the look-up table circuit 42 includes an array for storing information, such information including binary bit patterns which define various phase-shifted clock signals. The array, preferably a programmable read-only memory (PROM) device 44, is coupled to a clock control circuit 48. The clock control circuit 48 controls the loading of certain bit values or binary codes into the PROM 44, the codes providing addressing means such as indexing to the bit patterns in the PROM 44. A register 47, located in clock control circuit 48, stores the binary codes, the codes being proportional to the current system clock frequency or change in cable length. The register 47 is loaded by the computer system console, which is also responsible for initialization and diagnostic servicing for the computer system. In a preferred embodiment of the present invention, the register 47 is a frequency register, which means it contains information that is proportional to the current system clock frequency.

The programmable clock-phase generator circuit 50 includes a synchronizer, generally designated 60, coupled to a shift register 70. The synchronizer 60 consists of two state devices 62, 66, which are preferably D-type flip-flops, arranged in a 2-bit configuration and implemented in an ECLinPS 100E151 device. As is described more fully herein, the synchronizer 60 produces signals for enabling the functions of the shift register 70. The shift register 70 is an N-bit, rising edge triggered shift register, preferably an eight-bit, ECLinPS 100E142 device. The shift register 70 is a right-shift register having a shift (S) and load(not) (L(not)) enable input 72, otherwise known as "load select or shift" functions.

More specifically, a LFC signal is applied to the data input 61 of state device 62, while the Q1 output 64 of state device 62 is coupled to the data input 67 of state device 66. The Q1(not) output 65 of device 62 is then tied to the Q2 output 68 of state device 66, which is likewise coupled to the S/L(not) input 72 of shift register 70. A HFC signal is applied to the clocking inputs 63, 69, 71 of state devices 62, 66 and shift register 70, respectively.

The output 49 of the clock control circuit 48 couples the contents of the frequency register 47 to the input 45 of the PROM 44, while the output 46 of the PROM 44 is tied to the parallel load input 74 of shift register 70. The Qn−1 bit of the parallel output 78 of shift register 70 is then fed back to the serial data input 76 of shift register 70.

Operationally, the Q1(not) output 65 of the state device 62 of synchronizer 60 is connected to the Q2 output 68 of state device 66 to form an "OR-tied" signal which goes to a low state for a time duration equal to the HFC signal period every time the LFC signal transitions from a low state to a high state. When the "OR-tied" signal goes low, it loads the shift register 70 with a predetermined, programmed binary bit pattern from the PROM 44. The binary pattern loaded from the PROM 44 will circulate back in a serial, bit-by-bit manner to the data input 76 of the shift register 70. The binary pattern determines the relative phase of the generated LFC signals with respect to the reference LFC signal, that is, the shift register 70 outputs a number of generated LFC signal phases that are of the same frequency as the reference LFC signal. As previously mentioned, the frequency of LFC signal is an integral multiple of the frequency of the HFC signal or, to be specific, the HFC frequency is n times the LFC frequency.

In accordance with the concepts set forth herein, the multiplexer, a major element used in the prior art for programming the desired clock phases, is eliminated from the clock phase selection circuit. The present inventive combination utilizes a programmable storage array device containing binary bit patterns defining the relative position of desired clock signals coupled to a uniquely enabled shift register. The shift register is loaded once every reference clock cycle with the particular bit pattern to check or ensure that the bit pattern presented to the input of the shift register is not corrupted due to, for example, power signal transients.

In a preferred embodiment of the invention, the output 78 from the shift register 70 is hard-wired to various locations having logic that drives the cables, so that every time the frequency of the computer system changes or a different cable is installed, a new bit pattern is provided from the PROM 44. However, in accordance with the inventive teachings, clock phase selection is performed at the PROM 44 as opposed to the multiplexer and, as a result, does not affect the speed of the phase delay compensator circuit 40. Stated differently, the clock phase selection process has effectively moved from a sensitive area that impacted the speed and delay of the circuit, i.e. the multiplexer, to a non-sensitive area, i.e the PROM 44.

The phase delay compensator circuit 40 uses commercially available, high speed ECL devices, preferably Motorola ECLinPS devices, thereby, in accordance with an advantage of the invention, eliminating costly gate arrays. Although a different PROM 44 or look-up table is needed for each variation of interconnecting cables, such change is easily done and represents the only reconfiguration necessary to compensate for varying cable lengths, again resulting in cost savings.

As mentioned, the 2-bit synchronizer is preferably implemented using 2 of 6 D-type flip-flops in an ECLinPS 100E151 device, while additional buffering of the clock phases can be achieved via utilization of the remaining four flip-flops in the 100E151 package. If only one copy of the clock phase is desired, all the flip-flops can be eliminated, since any clock phase signal can be accessed directly from the shift register 70.

Figure 5:
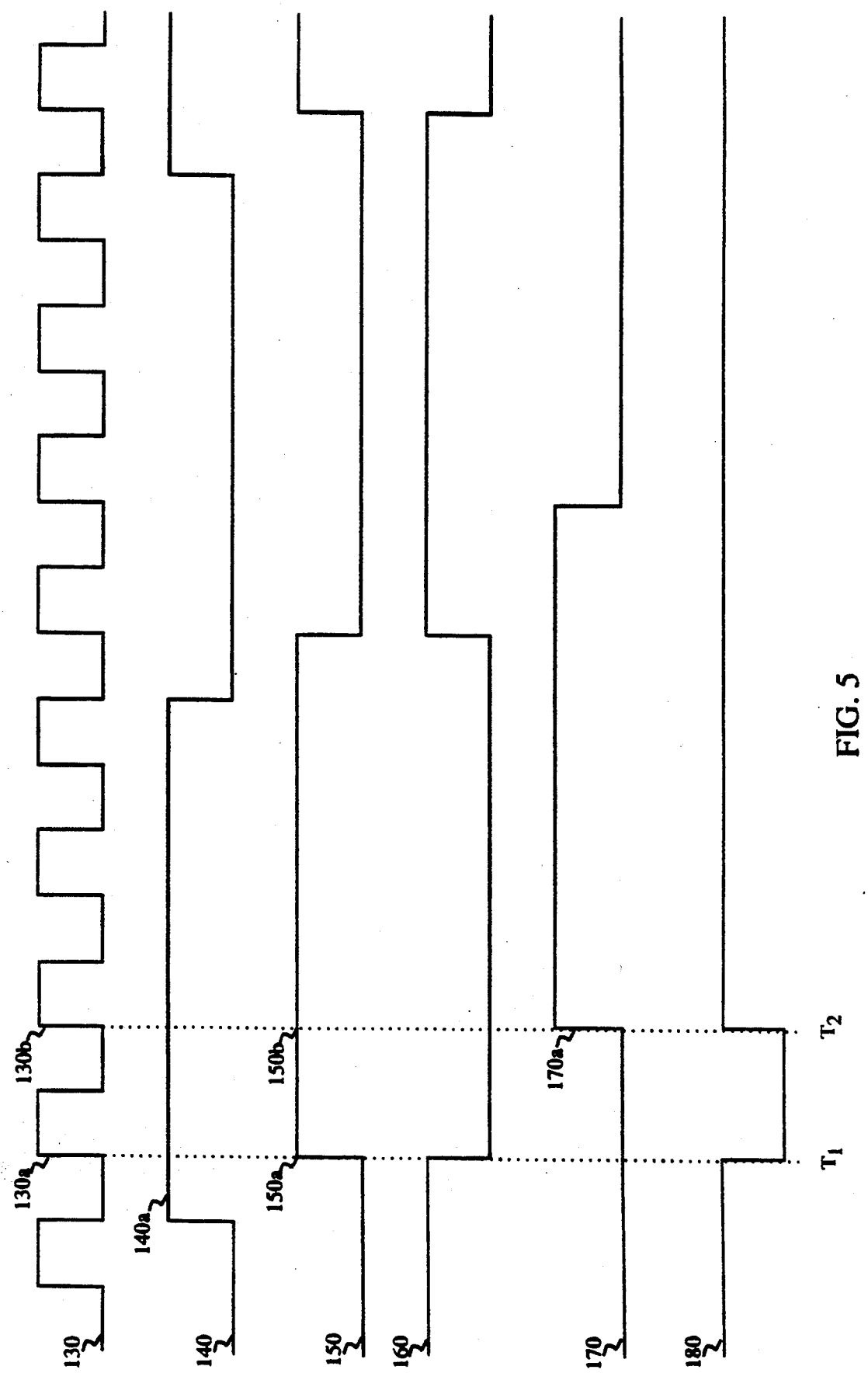
FIG. 5 is a timing diagram graphically showing the signals used to create a gated enabling signal for the phase delay compensator apparatus in accordance with the invention.

Referring now to FIG. 5 in conjunction with FIG. 4, the signals used to create a gated enabling signal 180 for the phase delay compensator apparatus 40 are shown. The gated signal 180 is actually a signal that is synchronous to reference transitions. The HFC signal 130 is fed to the clock input 63 of the state device 62 of synchronizer 60 as the LFC signal 140 is applied to the data input 61 of device 62. At a time T1, a rising edge transition 130a occurs in the HFC signal 130, while the LFC signal 140 is at a high level 140a. Thus, the signal 150 present at the Q1 output 64 of state device 62 at time $t_1$ has a rising edge transition 150a. The signal 160 present at the Q1(not) output 65 of device 62 is an inversion of the Q1 signal 150.

The Q1 signal 150 is then fed to the data input 67 of state device 66, which is also enabled by the HFC signal 130. At a time T2, a rising edge transition 130b occurs in the HFC signal 130, while the Q1 signal 150 is at a high level 150b. Thus, the signal 170 present at the Q2 output 68 of state device 66 at a time $T_2$ has a rising edge transition 170a.

In accordance with the teachings of the invention, the Q1(not) signal 160 is "tied" or coupled to the Q2 signal 170, thereby logically "OR-ing" the signals to create a gated signal 180. In order to activate the load function of the shift register 70, a logical "low" signal is required. "OR-ing" Q1(not) to Q2 eliminates additional logic, such as invertors, needed to create such an inverting function. In other words, a signal 180 is created for enabling the S/L(not) input 72 of the shift register 70 without the use of additional state devices or logic gates.

The shift register 70 uses a fast HFC signal, preferably 500 MHz, for enabling the register's function. When the gated signal 180 coupled to the S/L(not) input 72 of the shift register 70 is low, the rising edge of the HFC signal "loads" the phase bit-pattern value from the PROM 44 into the parallel load input 74 of the shift register 70. When the signal 180 coupled to the S/L(not) input 72 is high, the rising edge of the HFC signal "shifts" the contents of the register 70 one bit to the right.

The parallel output 78 of the shift register 70 is preferably eight bits, any of which are available to be selected depending upon the desired phase of the produced clock signal. In a preferred embodiment, one of the bits (phases) is tied or hard-wired to a state device, such as a buffer 79. If different phase or more than one phase of the clock signal requires accessing due to frequency or delay changes, another bit pattern is loaded into the PROM 44. Each bit/phase is offset by the HFC signal period, while the eighth bit, or the Qn−1 output bit, is shifted back to the serial input 76 of register 70.

As an example, a bit pattern having a binary value 00001111 is loaded into the shift register 70 during a load enable, the value 00001111 representing a clock signal of a particular phase and duty cycle, the duty cycle being 50% (half the period of the clock cycle is "low", the other half being "high"). The loaded bit pattern is then shifted one bit to the right during a shift enable. The Qn−1 bit is fed back into the serial input 76 of the shift register 70, resulting in a bit pattern 10000111 in the eight cells of the register 70. Each cell in the shift register 70 has one of the possible clock phases in it, the pattern of which repeats as long as the last bit is fed back to the first cell, thus effectively continually delaying the pattern.

While there has been shown and described a preferred embodiment, it is to be understood that various other adaptations and modifications may be made within the spirit and scope of the invention. For example, the invention is equally applicable to a shift register whose output is initially configured such that various bits or phases of the generated clock signal can be selected and stored, thus creating clock signals of various duty cycles. If a particular clock phase cycle is then desired, the bit pattern loaded into the configured shift register can be changed, changing the phases of the register's output accordingly. Similarly, although the preferred embodiment utilizes a look-up table having only frequency as a dynamic variable, it is to be understood that both cable delay differences and frequency could be the dynamic, inputted variables to the look-up table. Such generic embodiments provide another advantage within the teachings of the invention.

It will therefore be apparent to those skilled in the art that various changes and modifications in the specifically described embodiments can be carried out without departing from the scope of the invention which is to be limited only by the scope of the appended claims.

We claim:

1. Apparatus for maintaining a phase relationship between a clock signal and associated data in a synchronous computer, said apparatus comprising:
   means for dynamically translating a frequency change in the clock signal to a binary bit pattern defining a phase-shifted clock signal;
   means fed by said clock signal and a high frequency reference (HFR) clock signal for providing a gating signal in response to said clock signal and HFR clock signal; and
   means fed by said binary bit pattern for loading and recirculating said binary bit pattern in accordance with respective states of said gating signal to provide phases of said phase-shifted clock signal related to periods of said HFR clock signal.

2. The apparatus of claim 1 wherein said dynamically translating means includes array means for storing binary information.

3. The apparatus of claim 2 wherein said dynamically translating means further includes a clock control circuit coupled to said array means.

4. The apparatus of claim 3 wherein said means for providing said gating signal is a synchronizer.

5. The apparatus of claim 4 wherein said clock control circuit includes register means for storing binary codes proportional to a change in the frequency of said clock signal or a change in a length of cable connecting sub-assemblies fed by said clock signal.

6. The apparatus of claim 5 wherein said means for loading and recirculating includes a shift register and said shift register has a shift/load control input fed by said gating signal to control loading and shifting of said shift register.

7. The apparatus of claim 6 wherein said array means is a PROM.

8. The apparatus of claim 1 wherein said translating means includes register means for storing binary codes proportional to a change in the frequency of said clock signal or a change in a length of cable connecting sub assemblies fed by said clock signal.

9. The apparatus of claim 1 wherein said dynamically translating means further includes a clock control circuit coupled to said translating means, and wherein said clock control circuit includes register means for storing binary codes proportional to a change in the frequency of said clock signal or a change in a length of cable connecting sub-assemblies fed by said clock signal.

10. A method for maintaining a phase relationship between a clock signal and associated data signals in a synchronous computer in response to a phase change arising out of a change in the frequency of the computer's system clock or a change in the length of a cable connecting sub-assemblies of the computer, said method comprising the steps of:
   dynamically translating said frequency change to a binary bit pattern defining a phase-shifted clock signal;
   producing a gating signal in response to variations in the phase of the clock signal relative to the phase of a high frequency clock signal; and
   loading said binary bit pattern into a shift register and shifting said pattern through said shift register in response to said gating signal to provide phases of said phase-shifted clock signal.

11. The method of claim 10 wherein the step of dynamically translating further comprises the step of:
   loading into a register a binary code proportional to the current length of the cable or the current computer system clock frequency to provide in response thereto said binary bit pattern as an address to a memory.

12. A phase compensator apparatus for maintaining a phase relationship between a clock signal and associated data signals in a synchronous computer in response to a phase change arising out of a change in the frequency of the computer's system clock, the clock signal associated with said data signal or a change in the length of the cable connecting sub-assemblies of the computer, said apparatus comprising:
   array means for storing binary bit patterns representing phase-shifted clock signals;
   register means for storing binary codes proportional to said frequency change, said binary codes providing addressing means to said bit patterns in said array means;
   clock control circuit means for loading said binary codes into said array means;
   generating means for producing phases of each of said phase-shifted clock signals; and synchronizer means for providing a gating signal in response to variations in phase between said clock signal and said system clock signal for enabling loading of said binary bit patterns from said array means into said generator means.

13. The phase delay compensator apparatus of claim 12 further comprising means for ensuring the integrity of said binary bit pattern loaded into said generator means.

* * * * *